(12) United States Patent
Maehara

(10) Patent No.: US 7,661,515 B2
(45) Date of Patent: Feb. 16, 2010

(54) FRICTION MEMBER ASSEMBLY FOR DISC BRAKE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 11/407,135

(22) Filed: Apr. 20, 2006

(65) Prior Publication Data

US 2006/0237270 A1    Oct. 26, 2006

(30) Foreign Application Priority Data

Apr. 26, 2005    (JP) .......................... P.2005-128168

(51) Int. Cl.
*F16D 69/00*    (2006.01)

(52) U.S. Cl. .............................. 188/250 G; 188/250 B; 188/250 E; 188/73.1

(58) Field of Classification Search ............. 188/250 G, 188/250 B, 250 E, 73.1
See application file for complete search history.

(56) References Cited

U.S. PATENT DOCUMENTS

| | | | | |
|---|---|---|---|---|
| 3,198,294 A | * | 8/1965 | Stacy ......................... | 188/234 |
| 4,501,347 A | * | 2/1985 | Cerny et al. ............. | 188/250 G |
| 4,535,874 A | * | 8/1985 | Pollinger et al. ........... | 188/73.1 |
| 4,611,692 A | * | 9/1986 | Everett ....................... | 188/73.1 |
| 4,901,823 A | * | 2/1990 | Chang ........................ | 188/73.1 |
| 5,934,418 A | * | 8/1999 | Wirth ......................... | 188/73.1 |
| 6,478,125 B1 | * | 11/2002 | Russo et al. ............. | 188/250 E |
| 7,051,847 B2 | * | 5/2006 | Wirth ..................... | 188/250 G |

FOREIGN PATENT DOCUMENTS

| | | |
|---|---|---|
| DE | 33 17 585 A1 | 11/1984 |
| DE | 44 36 457 A1 | 4/1996 |
| JP | 10-507250 | 7/1998 |
| WO | WO 03/098068 | 11/2003 |

* cited by examiner

*Primary Examiner*—Robert A Siconolfi
*Assistant Examiner*—James K Hsiao
(74) *Attorney, Agent, or Firm*—Morgan, Lewis & Bockius LLP

(57) ABSTRACT

A solid box-shape structure is constituted by fitting a torque transmitting ring 23 to a guide hole 17 on a guide plate 11 to pivotably hold a lining member 13 and fixing the guide plate 11 to a torque receive plate 3. A braking torque is directly transmitted to the guide plate 11 by the torque transmitting ring 23 by pressing the lining member 13 to a disc rotor by a first link plate 7 and a second link plate 5 arranged on an inner side of the box-shape structure. A solid structure and alleviation of processing accuracy are made to be compatible with each other by constituting transmission of a press force and transmission of a torque by independent members in this way.

16 Claims, 20 Drawing Sheets

FRICTION MEMBER ASSEMBLY FOR DISC BRAKE

The present application claims foreign priority based on Japanese Patent Application No. P.2005-128168, filed on Apr. 26, 2005, the contents of which are incorporated herein by reference.

BACKGROUND OF THE INVENTION

1. Field of the Invention

The present invention relates to a friction member assembly for a disc brake used in a disc brake apparatus for, for example, a railroad vehicle. More particularly, the present invention relates to an improvement for realizing a reduction in cost and promotion of productivity by alleviating a processing accuracy of parts.

2. Related Art

A disc brake apparatus is constituted by a disc rotor fixed to an axle, a torque receive plate arranged opposedly to the disc rotor, a brake caliper including an actuator for driving the torque receive plate to move to and from the disc rotor and fixed to a vehicle body frame, and a lining member integrated to a face of the torque receive plate on a side of the disc rotor. When the torque receive plate is moved to the side of the disc rotor and the lining member is pressed to the disc rotor, a brake force by a sliding friction is generated.

In a disc brake apparatus for a railroad vehicle, a disc rotor and a brake lining are large-sized. Therefore, when the lining member to be pressed to the disc rotor is formed by an integrated part, a noncontact region is increased owing to a waviness produced at the disc rotor by friction heat or the like. As a result, a stable friction area cannot be maintained and a stable braking characteristic is not provided.

Hence, in order to resolve the problem, disclosed in JP-T-10-507250 is a brake lining in which a number of pieces of second link plates are laid on a torque receive plate substantially by a plane shape. In addition, a number of pieces of first link plates are laid on the respective second link plates independently from each other and pivotably, and a number of pieces of lining members are arranged on the respective first link plates independently from each other and pivotably. The respective lining members on the respective first link plates are brought into contact with a disc rotor by moving the torque receive plate to the side of the disc rotor.

According to the brake lining having such a constitution, the respective lining members divided to be small are brought into contact with a surface of the disc rotor by following a waviness of the surface of the disc rotor by respectively individual pivoting operation. Therefore, a stable braking characteristic can be maintained by maintaining a stable friction area.

However, according to the brake lining described in JP-T-10-507250, a position of the lining member above the torque receive plate is restricted by a first universal joint for connecting the lining member pivotably to the first link plate by a spherical contact portion in either of a direction in parallel with the surface of the lining member and in a direction orthogonal to the surface of the lining member. Further, also a position of the second link plate on the first link plate is restricted by a second universal joint for connecting the first link plate pivotably to the second link plate by a spherical contact portion in either of the direction in parallel with the surface of the lining member and the direction orthogonal to the surface of the lining member.

As a result, all of brake torque operated to the lining members in braking are successively transmitted from the lining members to the first link plates and from the first link plates to the second link plates by way of the spherical contact portions of the universal joints, finally transmitted to the torque receive plate coupled with the second link plates. Therefore, unless the respective universal joints are solidly processed and the spherical contact portions of the respective universal joints are processed with high accuracy, there is a concern of concentrating an excessive load on portions of the universal joints to destruct.

However, since a number of portions of using the universal joints is large and therefore, when all the universal joints need to be constituted solidly and the spherical contact portions and counter side contact portions brought into contact with the spherical contact portions need to be processed with high accuracy, there poses a problem that cost of processing parts is increased, an increase in cost of the brake lining and a reduction in productivity are brought about.

SUMMARY OF THE INVENTION

In accordance with one or more embodiments of the present invention, there is provided a brake lining capable of realizing a reduction in cost and promotion of productivity by alleviating a processing accuracy of parts, a reduction in a number of lining members used or the like.

(1) In accordance with one or more embodiments of the present invention, in a friction member assembly for a disc brake, hole portions for holding a number of lining members are formed on a guide plate at predetermined intervals in correspondence with an arrangement of link plates. The guide plate arranged in parallel with a face of a disc rotor is fitted with a torque transmitting ring at the hole portion of the guide plate. An outer shape portion of the torque transmitting ring is constituted by a spherical shape. The lining member is arranged on a side of one face of the guide plate. A spring member is arranged on a side of other face. The lining member is integrated to the guide plate by a rivet or a fastening rod, while the lining member is maintained to be pivotable. When the link plate receives a braking force for braking, the rivet or the fastening rod is pressed by the link plate, and the lining member is pressed onto the face of the disc rotor by way of the torque transmitting ring.

(2) In the constitution described in (1), the link plate for pressing the lining member may be positioned at a predetermined pressing position. A portion of the link plate which is brought into contact with the rivet or the fastening rod is engaged with the rivet or the fastening rod at a predetermined difference of radii of curvature thereof, so that the lining member is prevented from hindering a pivotable performance of the torque transmitting ring in the guide plate hole portion.

(3) In the constitution described in (1) or (2), the link plate may be arranged between the guide plate integrated with the number of lining members and a torque receive plate, so that a box-shape is constituted by fastening the guide plate and the torque receive plate (or, by providing a torque receiving portion at the guide plate and fastening a cover member). Related parts are brought into contact with each other without a clearance therebetween relative to a direction orthogonal to the disc rotor by a load of the spring member and a sufficient strength and swift transmission of an operating force are facilitated to achieve.

(4) In the constitution described in any one of (1) through (3), a pair of first link plates for individually pressing different two of the number of lining members and a single second link plate for simultaneously pressing the pair of first link plates and other one of the number of lining members are provided. A link mechanism of two stages for pressing five pieces of the lining members is constituted. The respective lining members can stably be pressed in correspondence with deformation of the disc rotor face by heat or the like.

(5) In the constitution described in any one of (1) through (4), by selecting respective positions of pressing the first link plate, the second link plate, for example, the lining member disposed on an outer peripheral side and the lining member disposed on an inner peripheral side can be adjusted to respectively exert pertinent press forces.

According to the brake lining described in (1), a position of the lining member is restricted by fitting the torque transmitting ring integrally fixed to the lining member and the hole portion of the guide plate in a direction in parallel with the disc rotor face of the lining member and by the portion for bringing the lining member and the first link plate into contact with each other in a direction orthogonal to the rotor face.

Therefore, a braking torque operated to the lining member in braking is transmitted from the torque transmitting ring to the guide plate, and directly transmitted to the torque receive plate integrated with the guide plate. Further, the press force for pressing the lining member to the disc rotor is transmitted by way of the portion for bringing the lining member and the first link plate into contact with each other from the contact portion of the first link plate and the second link plate to the second link plate, and from the contact portion of the second link plate and the torque receive plate to the torque receive plate.

That is, a member for receiving the braking torque from the lining member and a member for receiving the press force from the lining member are separately set, and the braking torque constituting a large load is not operated to the contact portion of the lining member and the first link plate, the contact portion of the first link plate and the second link plate and the contact portion of the second link plate and the torque receive plate 3 for transmitting the press force to the lining member.

Therefore, it is not necessary to constitute the respective contact portions for transmitting the press force by solid engagement of a ball joint or the like for receiving the braking torque and a reduction in cost by alleviating working accuracy and promotion of productivity can be realized.

According to the brake lining described in (2), the lining member is positioned by the hole portion of the guide plate, further, held pivotably by the torque transmitting ring the outer diameter portion of which is constituted by the spherical shape and therefore, the portions of the lining member and the link plate brought into contact with each other may be engaged with each other by the difference of radii of curvature capable of maintaining a degree of freedom of pivoting and the high accuracy working is not needed therefor.

According to the brake lining described in (3), the guide plate integrated with the number of lining members receives the braking torque and does not receive the press force and therefore, the plate thickness can be thinned, further, the box-shape is constituted by fastening the guide plate and the torque receive plate (or providing a torque receive at the guide plate and fastening a cover member) and therefore, a further solid structure can be constituted. Further, the link plates are arranged at inside of the box-shape, and brought into contact with each other without a clearance therebetween by the load of the spring member and the accuracy in the direction orthogonal to the disc rotor can easily be ensured.

According to the brake lining described in (4), the link mechanism of two stages is constituted by five pieces of the lining members by simultaneously pressing two of the first link plates and the single lining member by the second link plate, and a uniform press force can be transmitted to the respective lining members by a small number of the lining members.

According to the brake lining described in (5), by respectively selecting the positions of pressing the first link plate and the second link plate, depending on which positions the lining members are disposed, the lining members can be adjusted to constitute respective pertinent press forces and further effective braking can be realized.

Other aspects and advantages of the invention will be apparent from the following description and the appended claims.

REFERENCE NUMERALS AND CHARACTERS

- 1 . . . brake lining
- 3 . . . torque receive plate
- 5 . . . second link plate
- 5a . . . support hole
- 7 . . . first link plate
- 7a . . . support hole
- 9 . . . lining assembly
- 11 . . . guide plate
- 13 . . . lining member
- 15 . . . screw hole
- 17 . . . guide hole
- 21 . . . joint mechanism
- 23 . . . torque transmitting ring
- 25 . . . spring member
- 27 . . . rivet
- 27a . . . shaft portion
- 27b . . . head portion
- 27c . . . first expanded diameter portion
- 27d . . . second expanded diameter portion
- 27e . . . spherical concave face (spherical contact portion)
- 29 . . . joint member
- 29a . . . spherical convex face (spherical contact portion)
- 30 . . . brake lining
- 31 . . . steel ball (joint member)

DETAILED DESCRIPTION OF THE EXEMPLARY EMBODIMENTS

Exemplary embodiments of the invention will be described with reference to the accompanying drawings.

First Exemplary Embodiment

Figure 1:
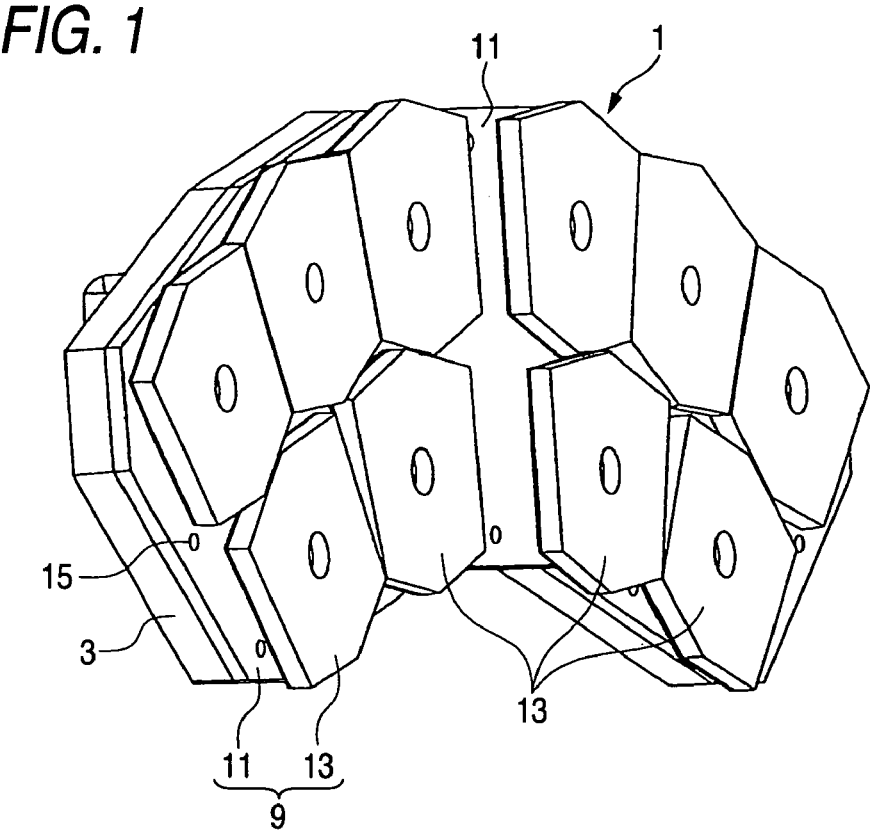
FIG. 1 is a perspective view of a first exemplary embodiment of a brake lining according to the invention.
Figure 2:
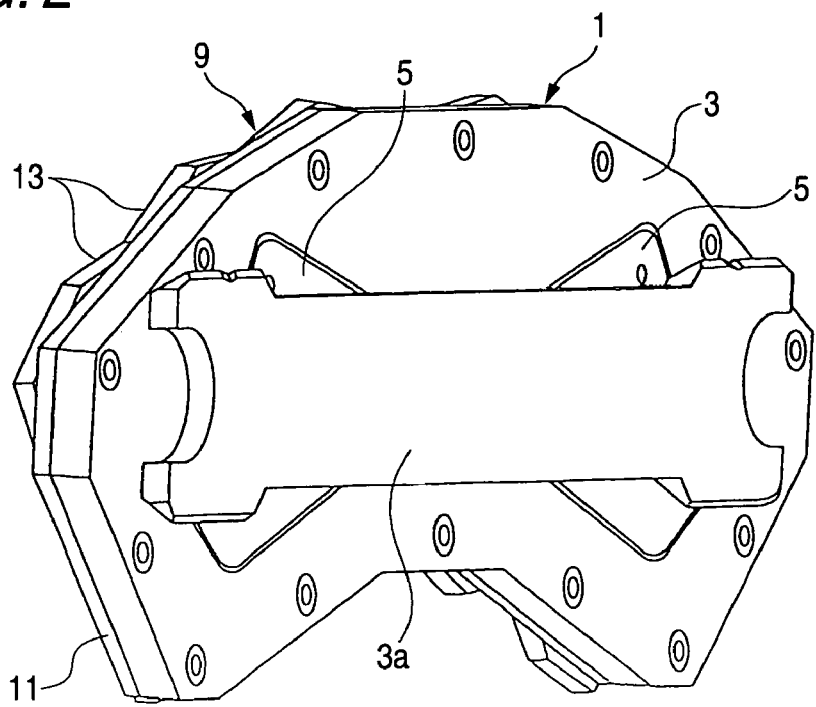
FIG. 2 is a perspective view viewing the brake lining shown in FIG. 1 from a rear face side.
Figure 3:
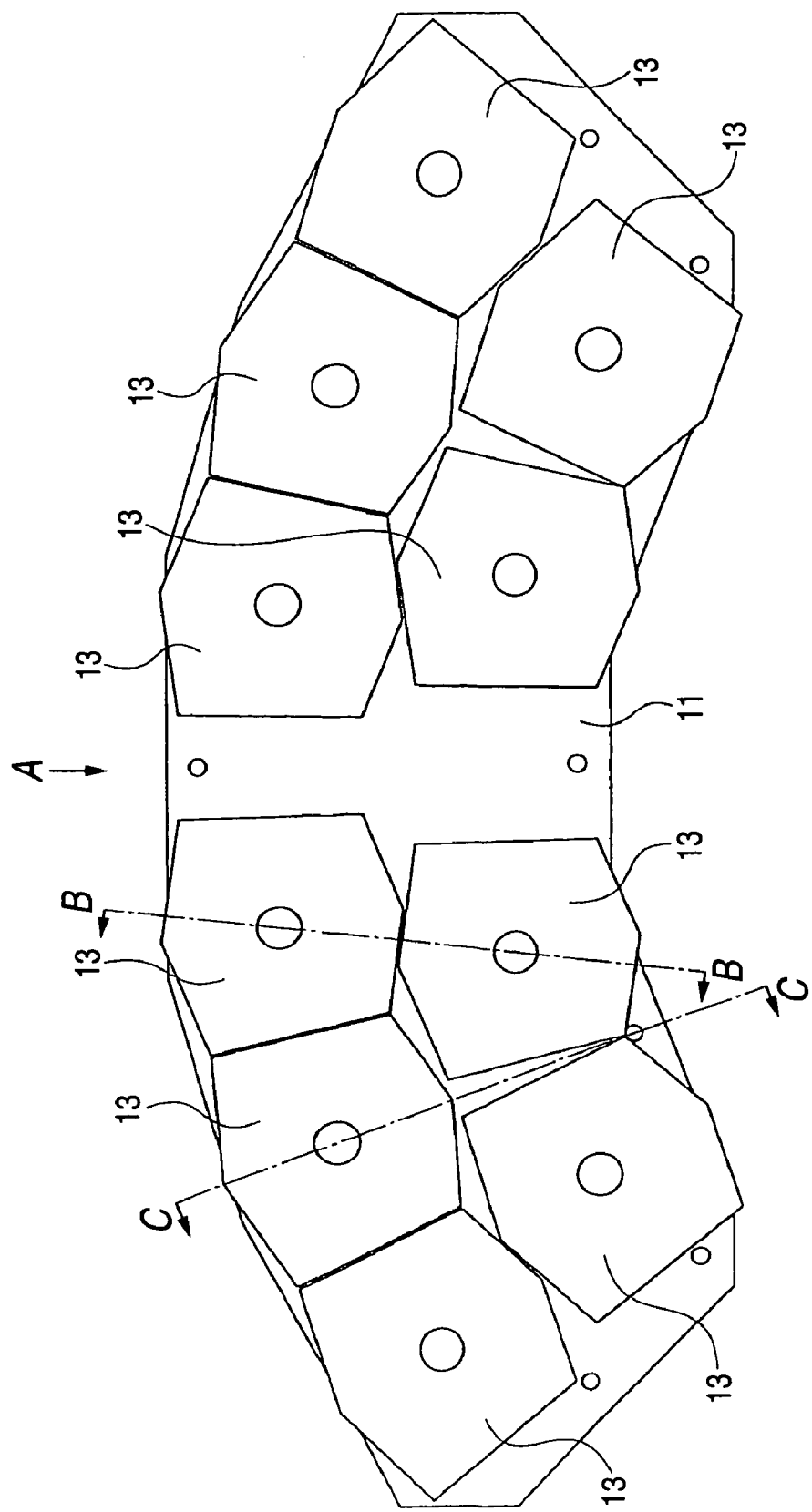
FIG. 3 is a front view of the brake lining shown in FIG. 1.
Figure 4:
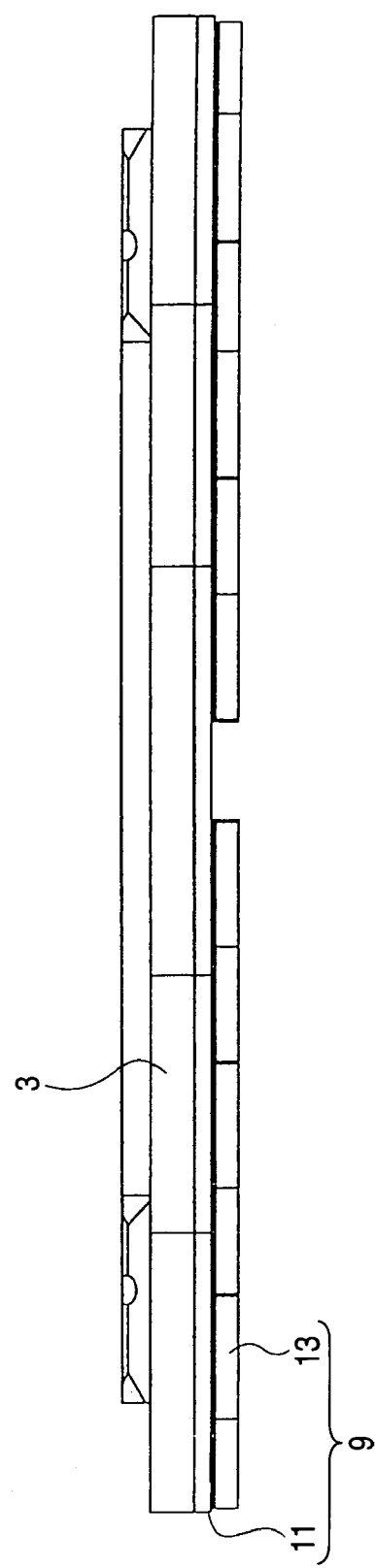
FIG. 4 is a view viewing FIG. 3 from an arrow mark A direction.
Figure 5:
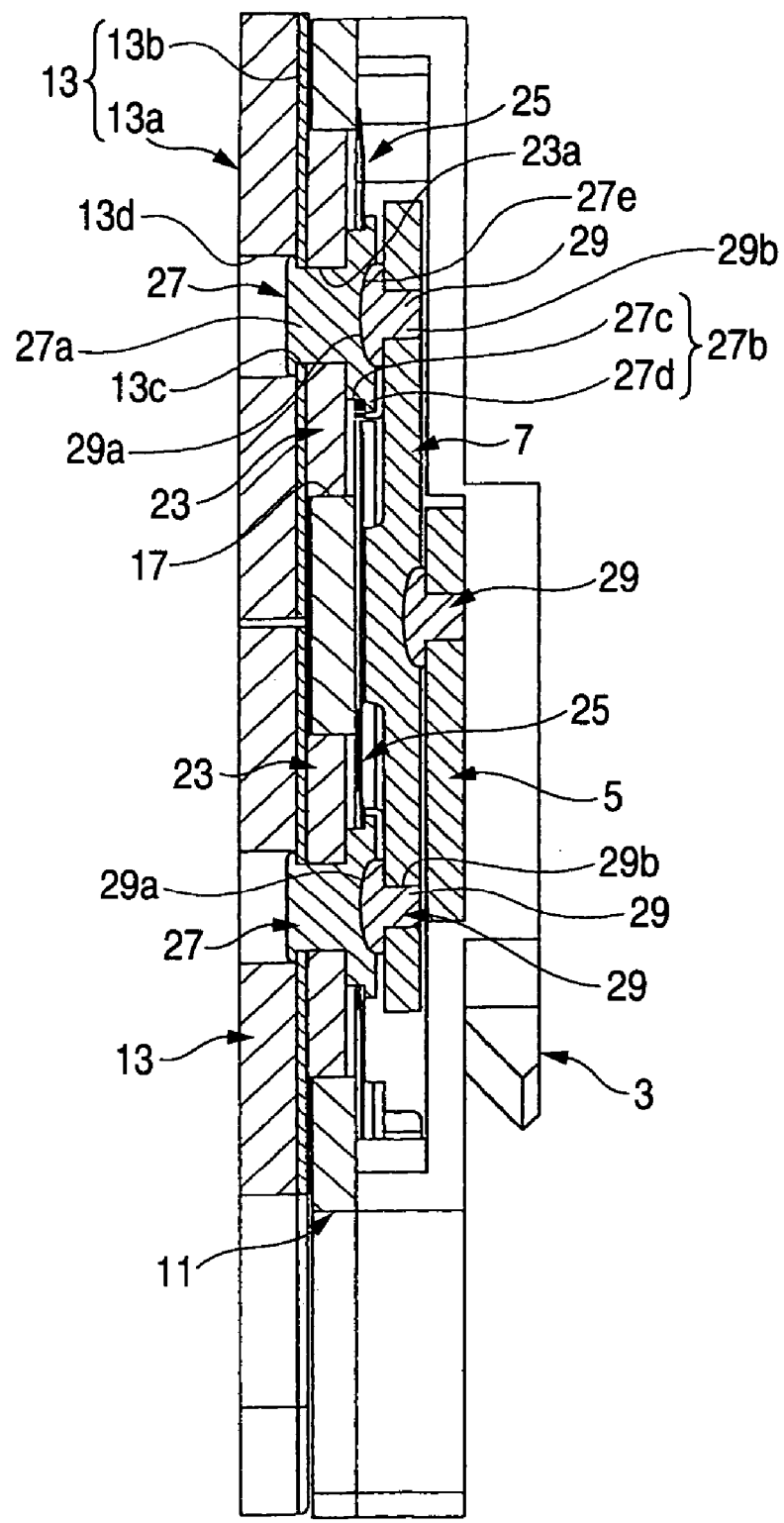
FIG. 5 is a sectional view taken along a line B-B of FIG. 3.
Figure 6:
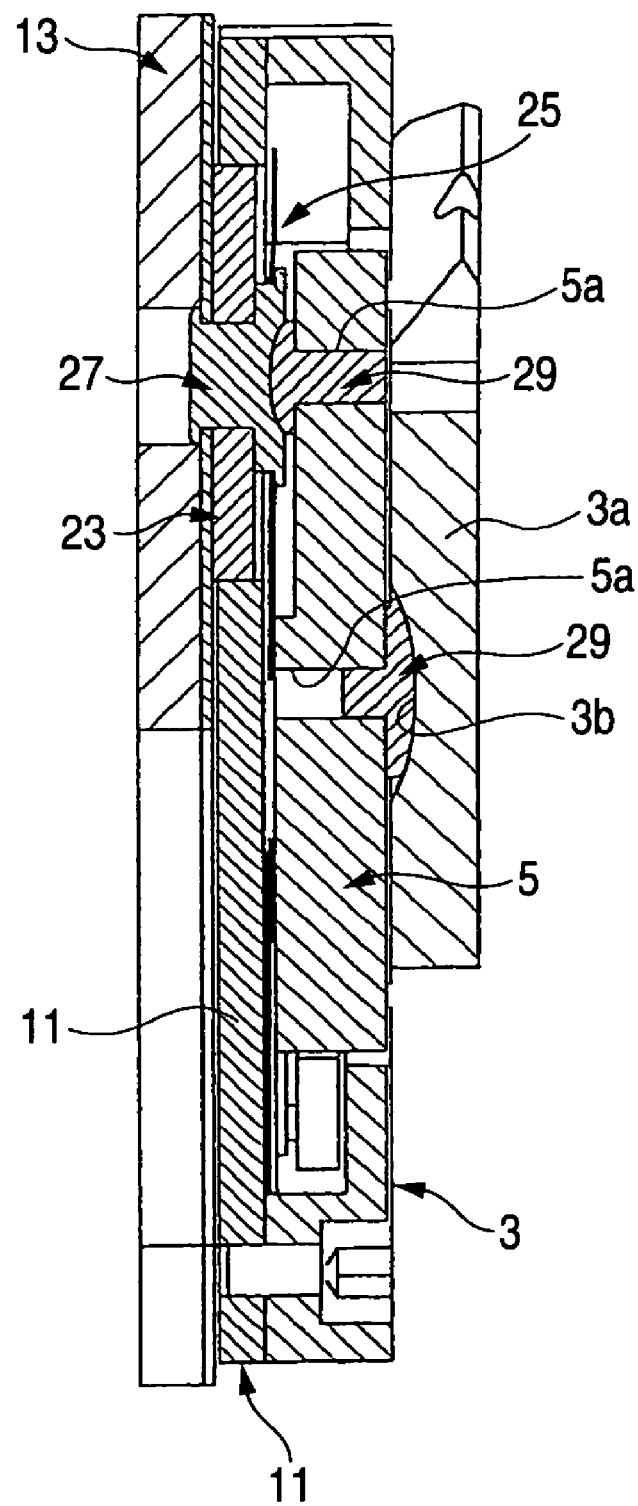
FIG. 6 is a sectional view taken along a line C-C of FIG. 3.
Figure 7:
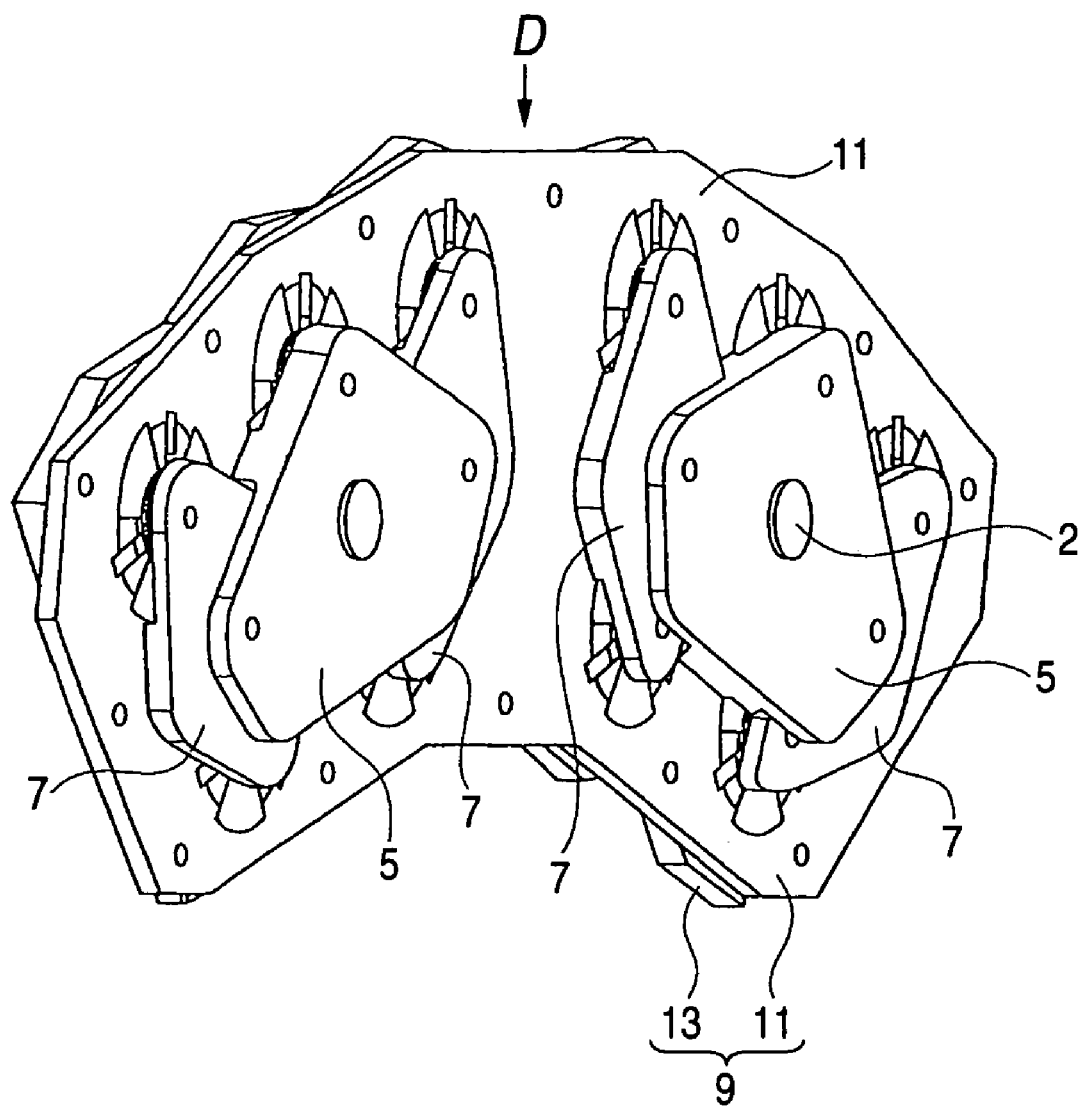
FIG. 7 is a perspective view showing a state of removing a torque receive plate from the brake lining shown in FIG. 2.
Figure 8:
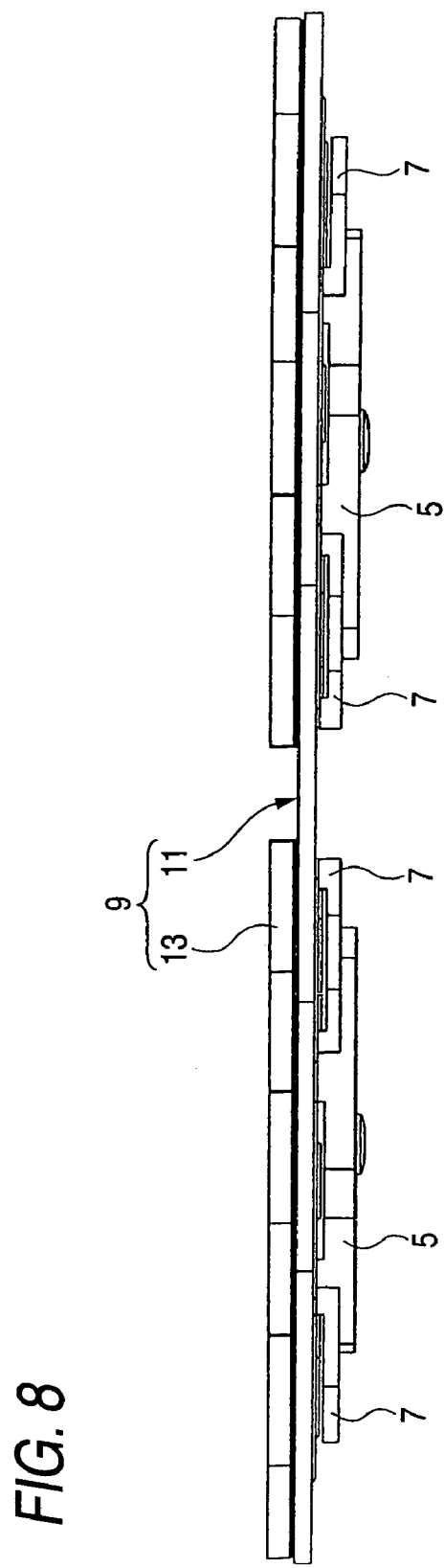
FIG. 8 is a view viewing FIG. 7 from a narrow mark D direction.
Figure 9:
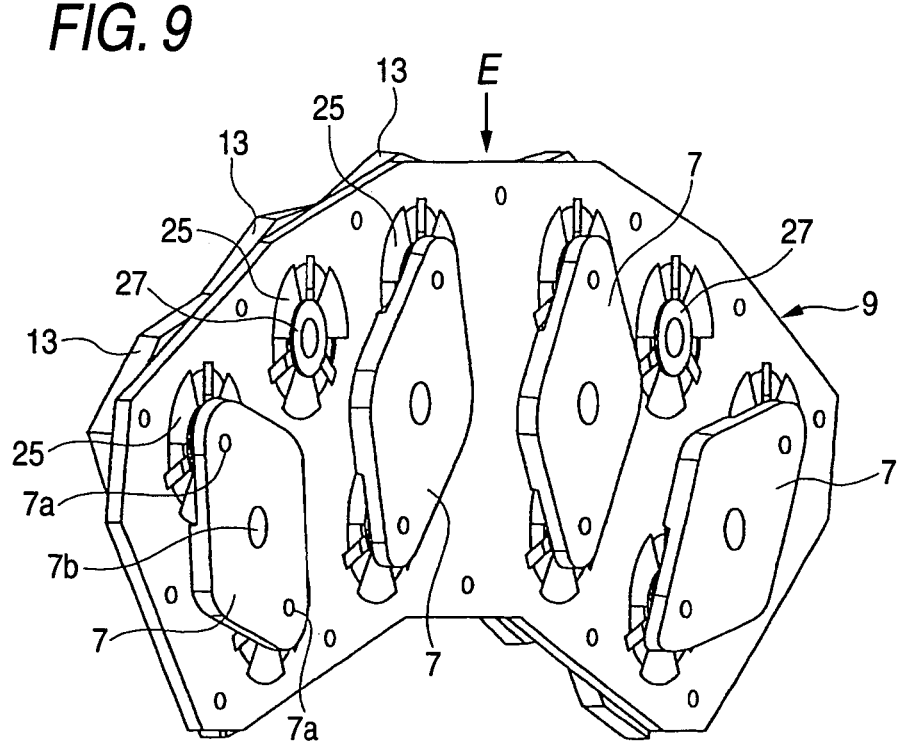
FIG. 9 is a perspective view of a state of removing a second link plate from a state of FIG. 7.
Figure 10:
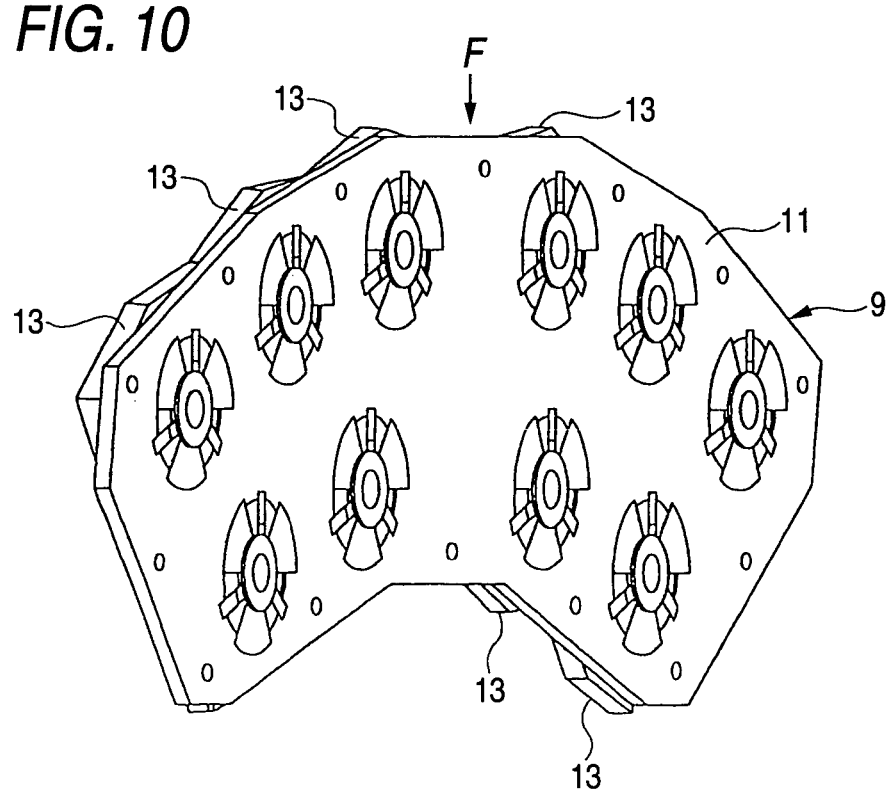
FIG. 10 is a view viewing FIG. 9 from an arrow mark E direction.
Figure 11:
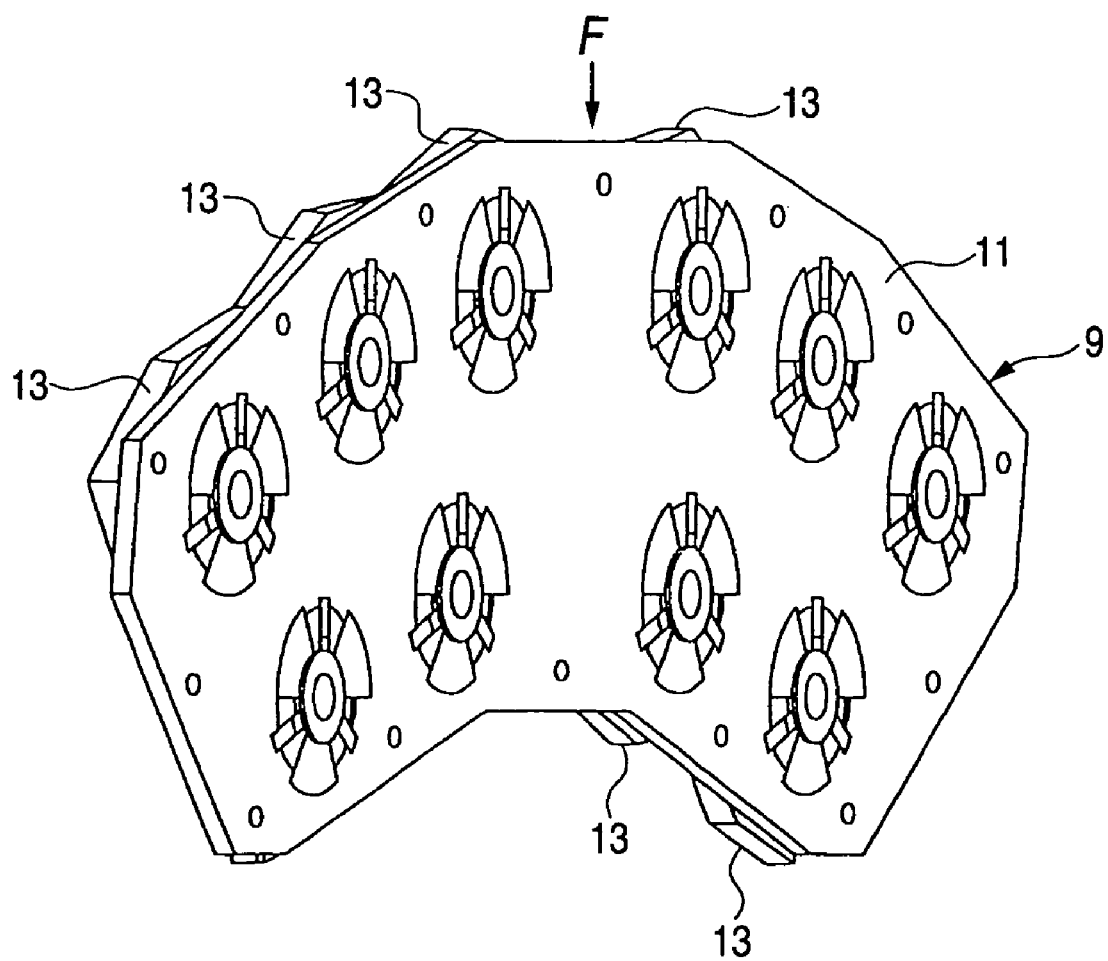
FIG. 11 is a perspective view of a state of removing a first link plate from a state of FIG. 9 (that is, lining assembly).
Figure 12:
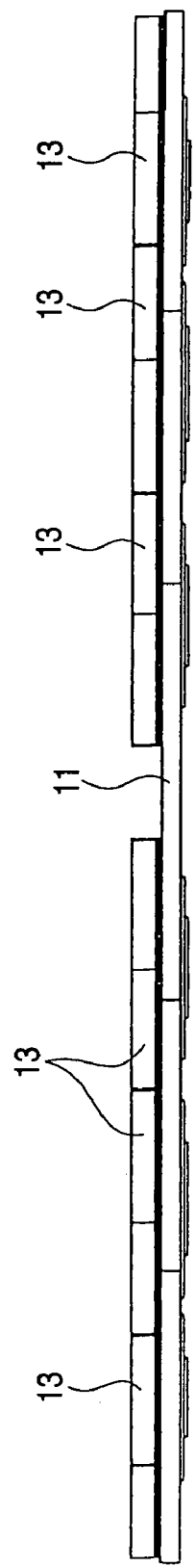
FIG. 12 is a view viewing FIG. 11 from an arrow mark F direction.
Figure 13:
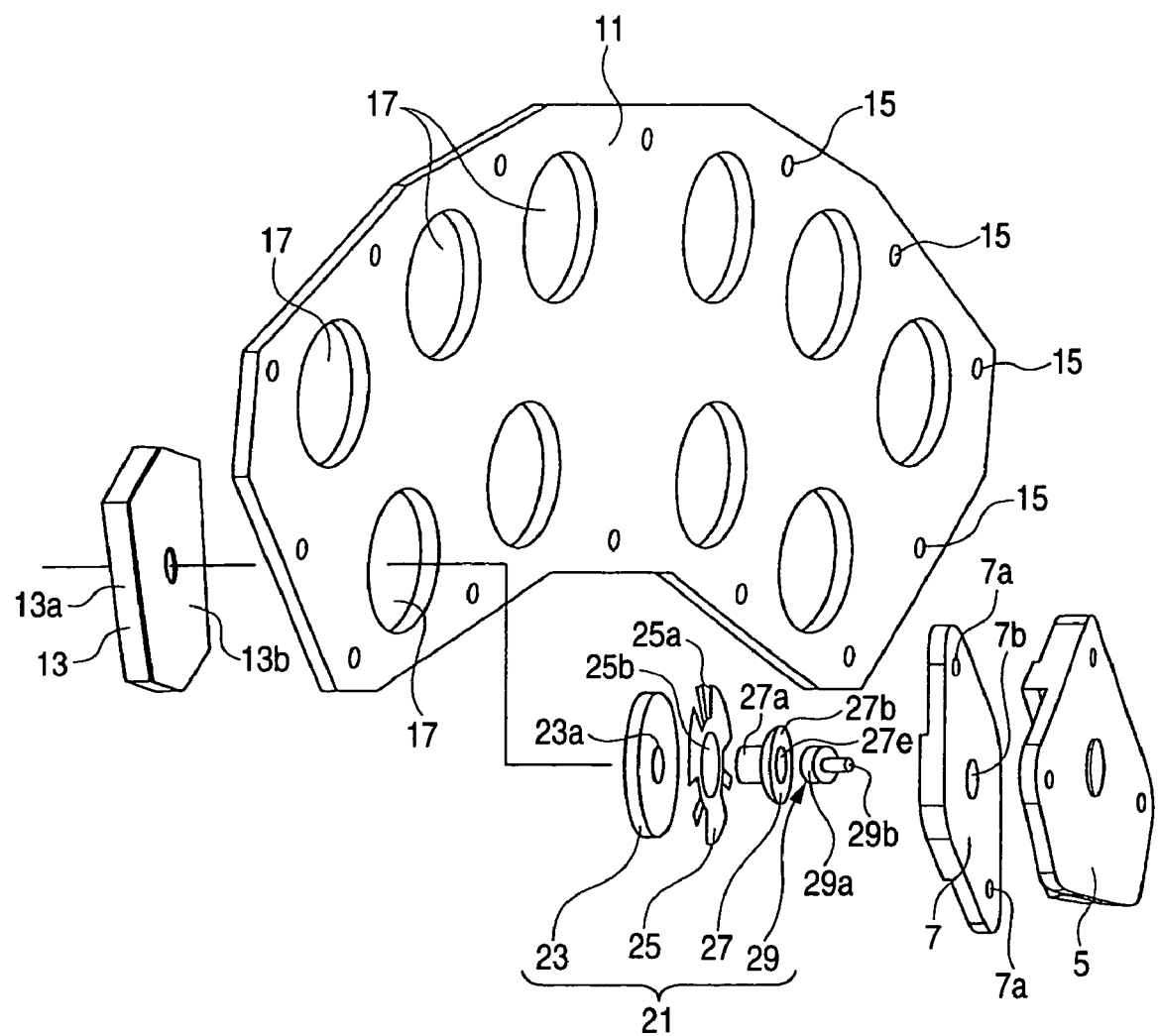
FIG. 13 is a disassembled perspective view of the lining assembly shown in FIG. 11.
Figure 14:
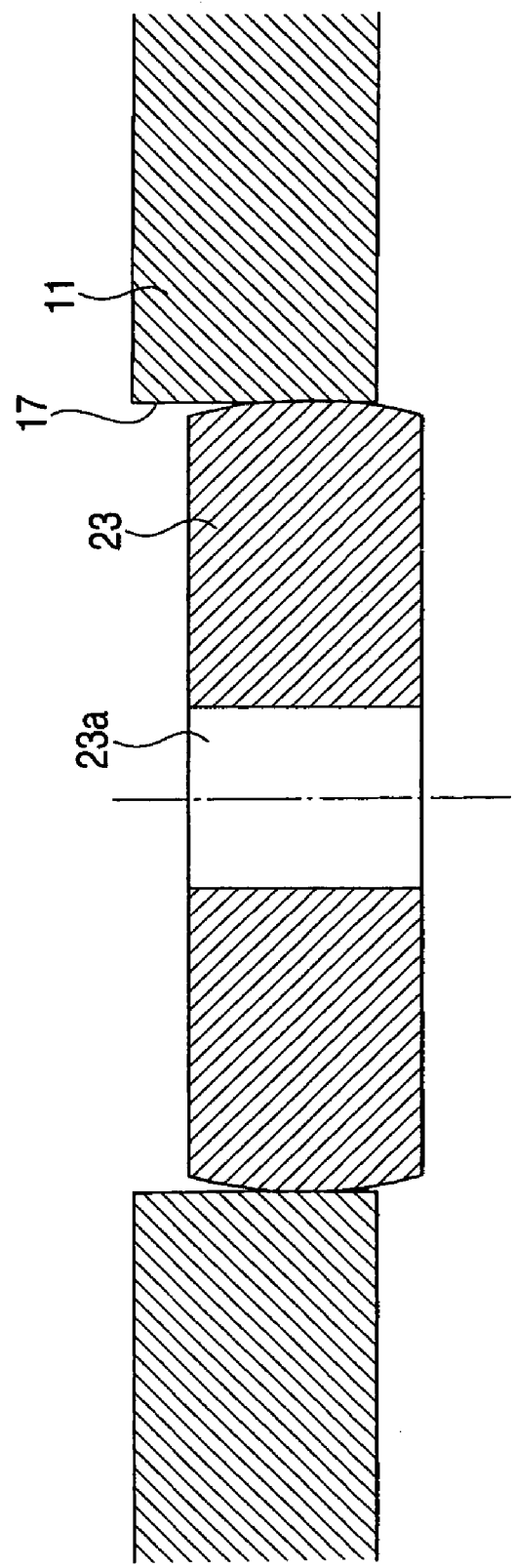
FIG. 14 is a view for explaining a state of engaging a torque transmitting ring and a guide hole
Figure 15:
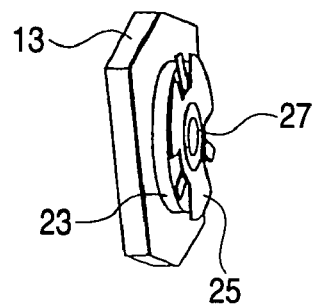
FIG. 15 is a perspective view of a state of attaching a locking member for holding a lining member to a guide hole of a guide plate to the lining member shown in FIG. 13.
Figure 16A:
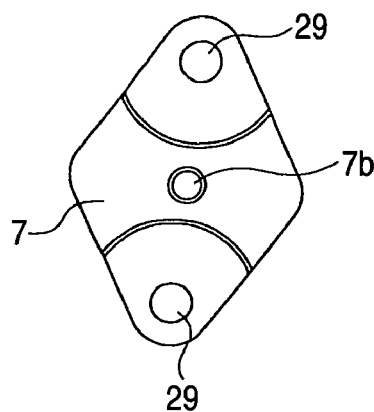
FIG. 16A is a front view of a first link plate shown in FIG. 13
Figure 16B:
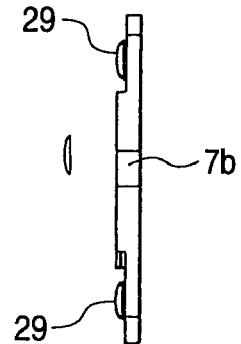
FIG. 16B is a side view of the first link plate.
Figure 17A:
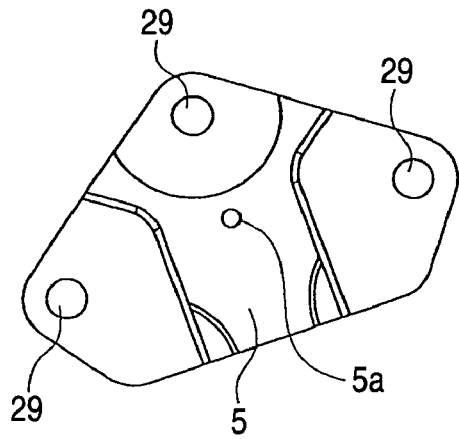
FIG. 17A is a front view of a second link plate shown in FIG. 13.
Figure 17B:
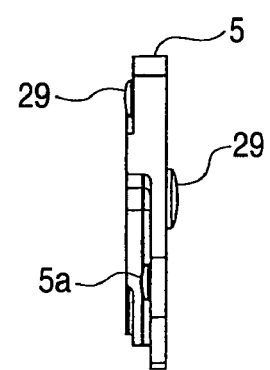
FIG. 17B is a side view of a second link plate shown in FIG. 13.

FIG. 1 through FIG. 17B show a first exemplary embodiment of a brake lining according to the invention, FIG. 1 is a perspective view of the first exemplary embodiment of the brake lining according to the invention, FIG. 2 is a perspective view viewing the brake lining shown in FIG. 1 from a rear face side, FIG. 3 is a front view of the brake lining shown in FIG. 1, FIG. 4 is a view viewing FIG. 3 in an arrow mark A direction, FIG. 5 is a sectional view taken along a line B-B of FIG. 3, FIG. 6 is a sectional view taken along a line C-C of FIG. 3, FIG. 7 is a perspective view of a state of removing a torque receive plate from the brake lining shown in FIG. 2, FIG. 8 is a view viewing FIG. 7 from an arrow mark D direction, FIG. 9 is a perspective view of a state of removing a second link plate from a state of FIG. 7, FIG. 10 is a view viewing FIG. 9 from an arrow mark E direction, FIG. 11 is a perspective view of a state of removing a first link plate from a state of FIG. 9 (that is, lining assembly), FIG. 12 is a view viewing FIG. 11 from an arrow mark F direction, FIG. 13 is a disassembled perspective view of the lining assembly shown in FIG. 11, FIG. 14 is a sectional view of a guide hole of a guide plate shown in FIG. 13 and a torque transmitting ring fitted to the guide hole, FIG. 15 is a perspective view of a state of attaching a locking member for holding the lining member by the guide hole of the guide plate to the lining member shown in FIG. 13, FIG. 16A is a front view of a first link plate shown in FIG. 13, FIG. 16B is a side view of the first link plate, FIG. 17A is a front view of a second link plate shown in FIG. 13, FIG. 17B is a side view of the second link plate.

A brake lining 1 according to the first exemplary embodiment is used in a disc brake apparatus for a railroad vehicle. The brake lining 1 is provided with a torque receive plate 3 driven to be moved to and from a disc rotor by an actuator included in a brake caliper fixed to a vehicle body frame arranged oppositely to a disc rotor on an axle. In addition, the brake lining 1 is provided with a number of lining members 13 integrated to a guide plate 11 as shown by FIG. 11. Moreover, the brake lining 1 is provided with four first link plates 7 laid to be brought into contact with different twos of lining members 13 as shown by FIG. 7 and FIG. 9. The brake lining 1 is disposed between the torque receive plate 3 and the lining members 13. In addition, the brake lining 1 is provided with two second link plates 5. Each second link plate 5 simultaneously presses a pair of the first link plates 7 in the four first link plates 7 and other one of the lining members 13.

As shown by FIG. 11 and FIG. 12, a lining assembly 9 is constituted by integrating a number of pieces of the lining members 13 to the single guide plate 11 screwed to be fixed to the torque receive plate 3 to unitize (constitute a subassembly).

As shown by FIG. 13, the guide plate 11 is constituted by a single plate member and is formed with screw holes 15 to penetrate at pertinent intervals at an outer peripheral edge portion thereof. The guide plate 11 is fixed to the torque receive plate 3 by screw members inserted through the screw holes 15.

Further, the guide plate 11 is formed with guide holes 17 constituting lining member holding hole portions for integrating the lining members 13 at predetermined intervals. The guide hole 17 is a circular hole having a diameter smaller than the lining member 13.

Each lining member 13 is arranged on a face of the guide plate 11 on a side of the torque receive plate 3. The each lining member 13 is attached to the guide plate 11 by way of the guide hole 17 of the guide plate 11 by a joint mechanism 21 shown in FIG. 13.

As shown by FIGS. 5, 6 and FIG. 13, the joint mechanism 21 is constituted by a torque transmitting ring 23, a spring member 25, a rivet (or fastening rod) 27, and a joint member 29. The torque transmitting ring 23 is overlapped to a rear face of the lining member 13 and fitted to a guide hole 17. The spring member 25 is overlapped on a rear face side of the torque transmitting ring 23. A shaft portion 27a of the rivet (or fastening rod) 27 is inserted through center portions of the lining member 13 and the torque transmitting ring 23 and the spring member 25 to connect them. The joint member 29 is mounted to a head portion of the rivet 27 and constituting a portion connected with the first link plate 7.

In the case of the present exemplary embodiment, the lining member 13 is constituted to include a lining main body 13a an outer shape of which is formed substantially in a hexagonal shape, and a back plate 13b pasted to a rear face of the lining main body 13a. As shown by FIG. 5, a hole diameter of a rivet (fastening rod) inserting hole 13c formed to penetrate a center of the back plate 13b is set to be smaller than a rivet (or fastening rod) inserting hole 13d formed to penetrate a center of the lining main body 13a.

By enlarging to show in FIG. 14, the torque transmitting ring 23 is constituted by a circular plate shape an outer diameter of which is set to be more less smaller than an inner diameter of the guide hole 17. An outer shape of the torque transmitting ring 12 is constituted by a spherical shape. In a center of the torque transmitting ring 12, a rivet (or fastening rod) inserting hole 23a for inserting the shaft portion 27a of the rivet (or fastening rod) 27 is formed.

In braking, the torque transmitting ring 23 serves to transmit a braking torque to the guide plate 11 by bringing the outer shape spherical face portion into contact with a cylinder inner face portion of the guide hole 17 by the braking torque operated to the lining member 13. The torque transmitting ring 23 ensures a pivotable performance on the cylinder inner face portion of the guide hole 17 so as to push the lining member(s) 13 uniformly to the disc rotor face.

The torque transmitting ring 23 is formed by a material having a strength sufficient for receiving the braking torque.

The spring member 25 is a leaf spring provided with notch portions 25a cut in a radius direction at several portions of an outer periphery thereof. An outer shape dimension of the spring member 25 is set to be larger than the inner diameter of the guide hole 17. In a center of the spring member 25, a rivet (or fastening rod) inserting hole 25b for inserting the shaft portion 27a of the rivet (or fastening rod) 27 is formed. A diameter of the rivet (or fastening rod) inserting hole 25b is set to be larger than the rivet (or fastening rod) inserting hole 23a of the torque transmitting ring 23.

As shown by FIG. 5, the rivet (or fastening rod) 27 includes the shaft portion 27a inserted through center portions of the lining member 13 and the torque transmitting ring 23 and the spring member 25, and a head portion 27b mounted to one end side of the shaft portion 27a. As shown by FIG. 5, the head portion 27b includes an expanded diameter portion set to a diameter larger than the rivet (or fastening rod) inserting hole 23a of the torque transmitting ring 23 and is formed with a spherical face 27e concave or convex to a side of being opposed to the link plate 7.

As shown by FIG. 5, the rivet (or fastening rod) 27 couples the torque transmitting ring 23 and the spring member 25 to the lining member 13 by calking an end portion of the shaft portion 27a inserted through the respective rivet (or fastening rod) inserting holes 25b, 23a, 13c of the spring member 25, the torque transmitting ring 23, the lining member 13 in a state of fitting the torque transmitting ring 23 to the guide hole 17 (or providing a groove portion at the shaft portion 27a and mounting a clip thereto). Further, as shown by FIG. 5, the lining member 13 and the spring member 25 squeeze the guide plate 11. The torque transmitting ring 23 fitted (loosely fitted) into the guide hole 17 is maintained in a state of being held in the guide hole 17.

The lining assembly 9 is completed when the lining members 13, the torque transmitting rings 23, the spring members 25 are integrated to positions of all of the guide holes 17 on the guide plate 11 by the above-described method.

In the case of the present exemplary embodiment, as shown by FIG. 5 and FIG. 13, the joint member 29 is constructed by a constitution of having a spherical convex face 29a brought into spherical contact with the spherical concave face 27e of the rivet 27 by a radius of curvature smaller than a radius of curvature of the spherical concave face 27e of the rivet 27 substantially by about 0.5 mm on one end side thereof. The joint member 29 includes a shaft portion 29b fitted to be supported by a support hole 7a of the first link plate 7 on other end side thereof. By bringing the spherical concave face 27e and the spherical convex face 29a into contact with each other by a difference between radii of curvature, the pivotable performance is maintained in the lining member 13 at a portion thereof fitted to the hole portion 17 of the guide plate 11. Further, the spherical contact portion constitutes a contact portion for transmitting a press force of the first link plate 7 to the lining members 13.

As shown by FIGS. 9, 16A and 16B, in the first link plate 7, the support holes 7a respectively fitted with the joint members 29 are formed. By engaging the contact portion of the joint member 29 and the lining member 13 fitted to each support hole 7a with a clearance (for example, difference between radii of curvature) in a direction in parallel with a lining face, the lining member 13 is supported to be able to pivot on the cylindrical face of the guide hole 17 of the guide plate 11. Further, in a predetermined position of the first link plate 7, a joint support hole 7b for being brought into contact with a second link plate 5 to be engaged therewith is formed.

As shown by FIGS. 7, 17A and 17B, at a total of three locations of positions in correspondence with the predetermined positions of the contiguous two first link plates 7 and a position in correspondence with the spherical concave face 27e formed at the rivet (or fastening rod) 27 of the single lining member 13 which is not supported by the first link plate 7, the second link plate 5 brings the spherical convex faces 29a of the joint members 29 into contact with the spherical concave faces 27e, so that the first link plates 7 and the single lining member 13 are pivotably support by a predetermined degree of freedom.

Further, in a predetermined position of the second link plate 5, the support hole 5a to be fitted with the joint member 29 is formed.

As shown by FIG. 6, the support hole 5a in the predetermined position of the second link plate 5 is mounted with the joint member 29 to direct the spherical convex face 29a to an outer side (side reverse to the first link plate 7). The joint member 29 is brought into contact with a spherical concave face 3b formed on an inner side of a support bar 3a bonded and integrated to a rear face side of the torque receive plate 3 to be supported pivotably with a predetermined degree of freedom.

Further, a spherical convex face 29a of the joint member 29 mounted to the support hole 5a in the predetermined position of the second link plate 5 is formed to be larger than the joint member used at other location as is apparent in comparing these on FIG. 6. This because the spherical convex face 29a is operated with a large press force necessary for pressing a total of five pieces of lining members 13 to the disc rotor.

The lining assembly 9 is assembled to integrate all of the lining members 13 at the guide plate 11 as shown by FIG. 11, beforehand. Successively, as shown by FIG. 9 and FIG. 7, the first link plates 7 and the second link plate 5 are assembled onto the lining assembly 9. Thereafter, the guide plate 11 is fixed to the torque receive plate 3, so that the above-described brake lining 1 is completed.

According to the brake lining 1 explained above, the position of the lining member 13 above the torque receive plate 3 is restricted by fitting the torque transmitting ring 23 mounted to the lining member 13 to the hole portion 17 of the guide plate 11 in a direction in parallel with the surface of the lining member 13. In addition, by the spherical contact portion mounted to one end of the lining member 13, the position of the lining member 13 is restricted in a direction orthogonal to the lining member 13.

Therefore, a braking torque operated to the lining member 13 in braking is transmitted from the torque transmitting ring 23 to the guide plate 11 and is directly transmitted to the torque receive plate 3 fixed with the guide plate 11. Further, the press force for pressing the lining member 13 to the disc rotor is transmitted from the torque receive plate 3 to the second link plate 5, from the second link plate 5 to the first link plate 7, and from the first link plate 7 to the lining member 13.

That is, a member by which the lining member 13 receives the braking torque and a member by which the lining member 13 receives the press force are separately and independently set. Further, the spherical portions which are difficult to work are formed with the difference of radii of curvature of about 0.5 mm and used mainly for transmitting the press force. Therefore, the spherical portions need not to be worked with high accuracy. As a result, the spherical portions can easily be processed. By constructing the constitution for separating the members for transmitting the press force and receiving the braking torque in this way, solid positioning for firmly receiving the braking torque even when the working accuracy is alleviated can be realized. Therefore, a reduction in cost, promotion of productivity can be realized.

Further, a number of the lining members 13 are integrated to the first link plate 7 and the second link plate 5, after constituting the lining assembly 9 by previously integrating the lining members 13 to the guide plate 11 as described above. As a result, an assembling performance is promoted and the promotion of productivity can be achieved.

Second Exemplary Embodiment

Figure 18:
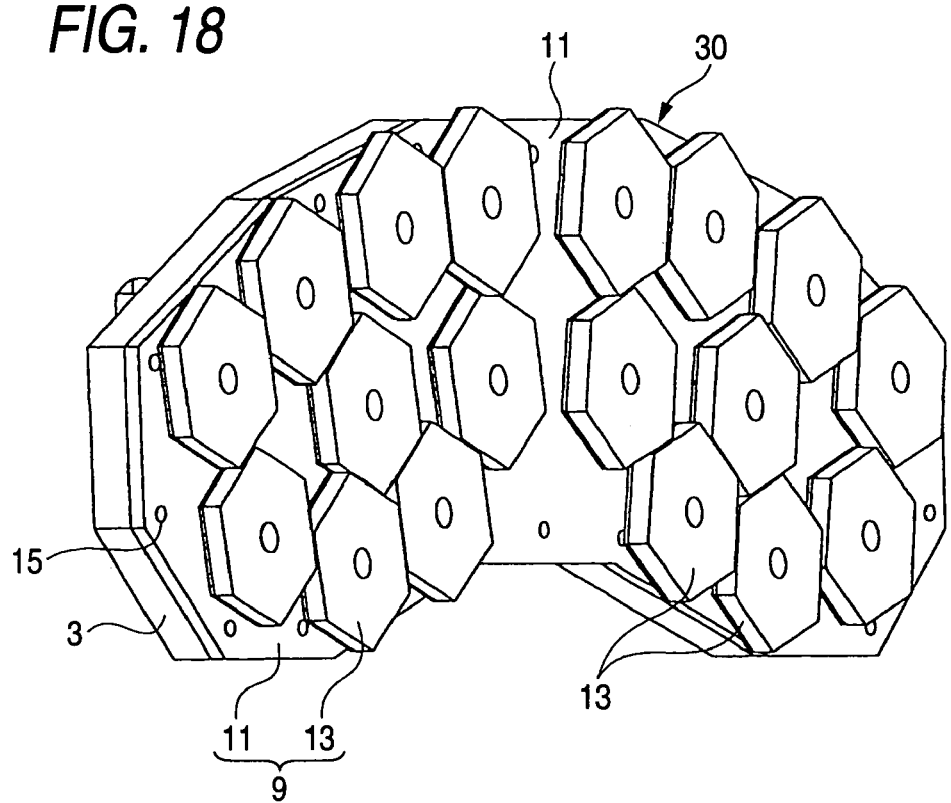
FIG. 18 is a perspective view of a second exemplary embodiment of a brake lining according to the invention.
Figure 19:
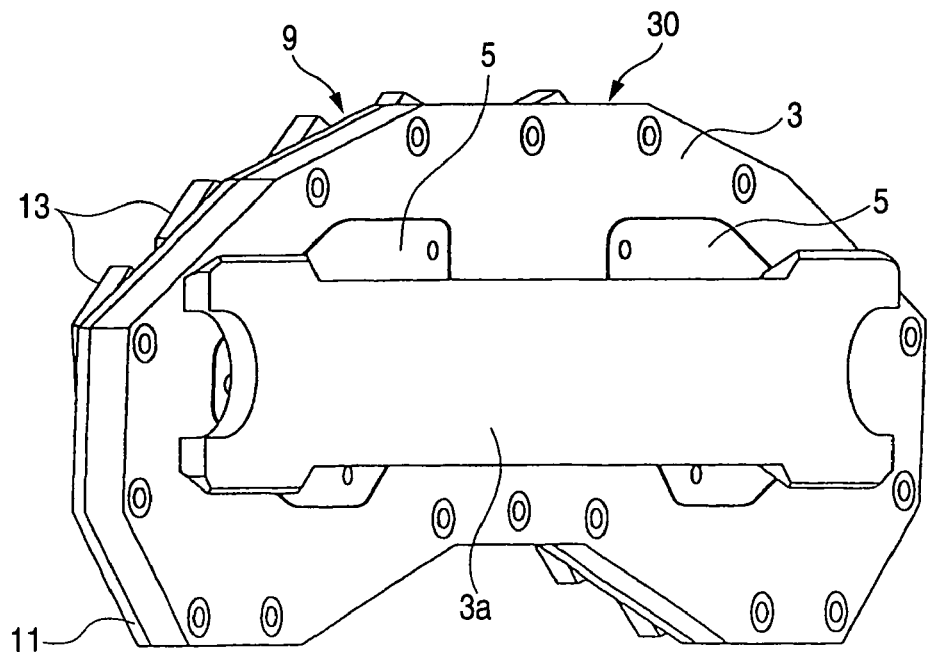
FIG. 19 is a perspective view viewing the brake lining shown in FIG. 18 from a rear face side.
Figure 20:
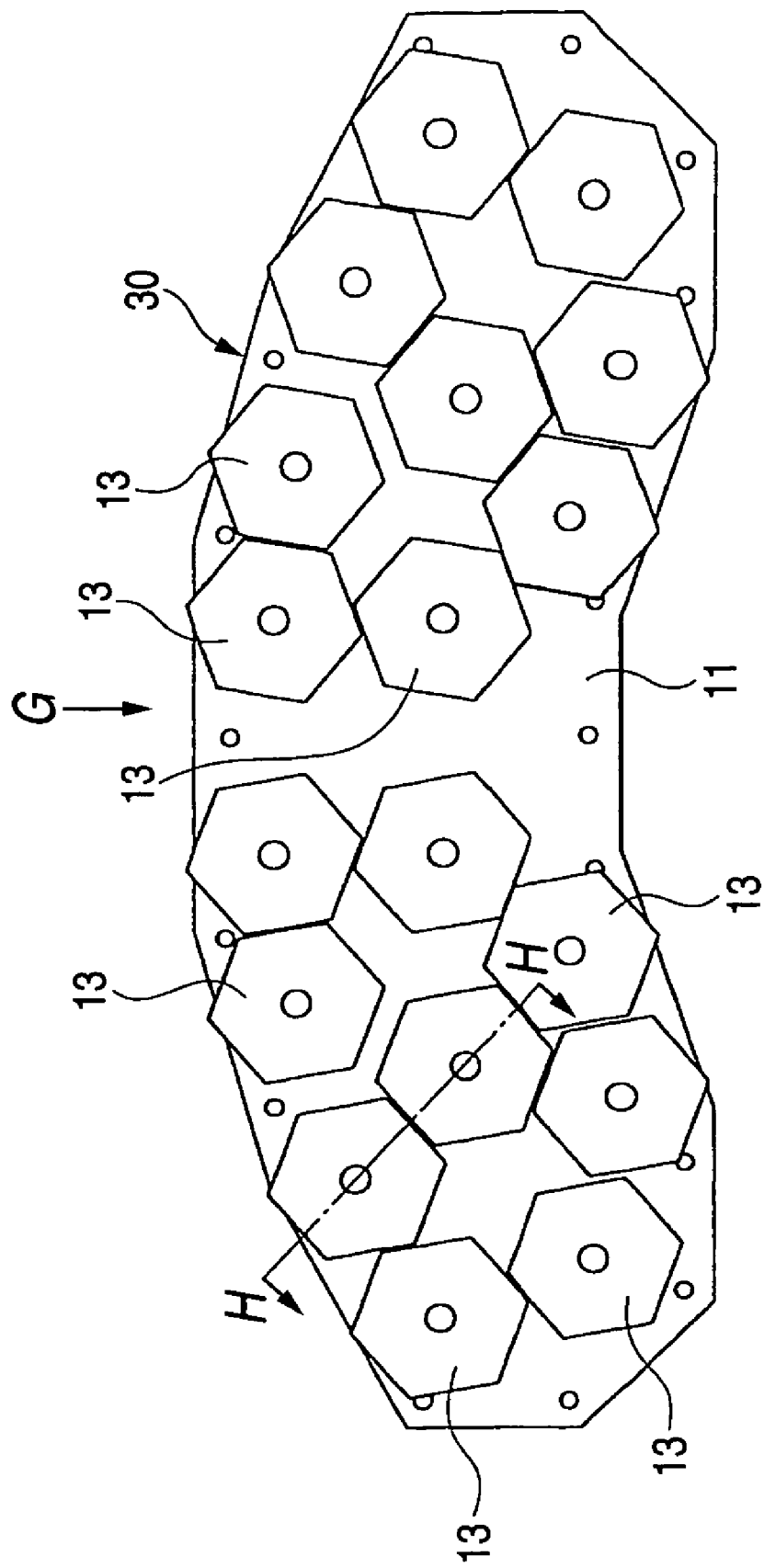
FIG. 20 is a front view of the brake lining shown in FIG. 18.
Figure 21:
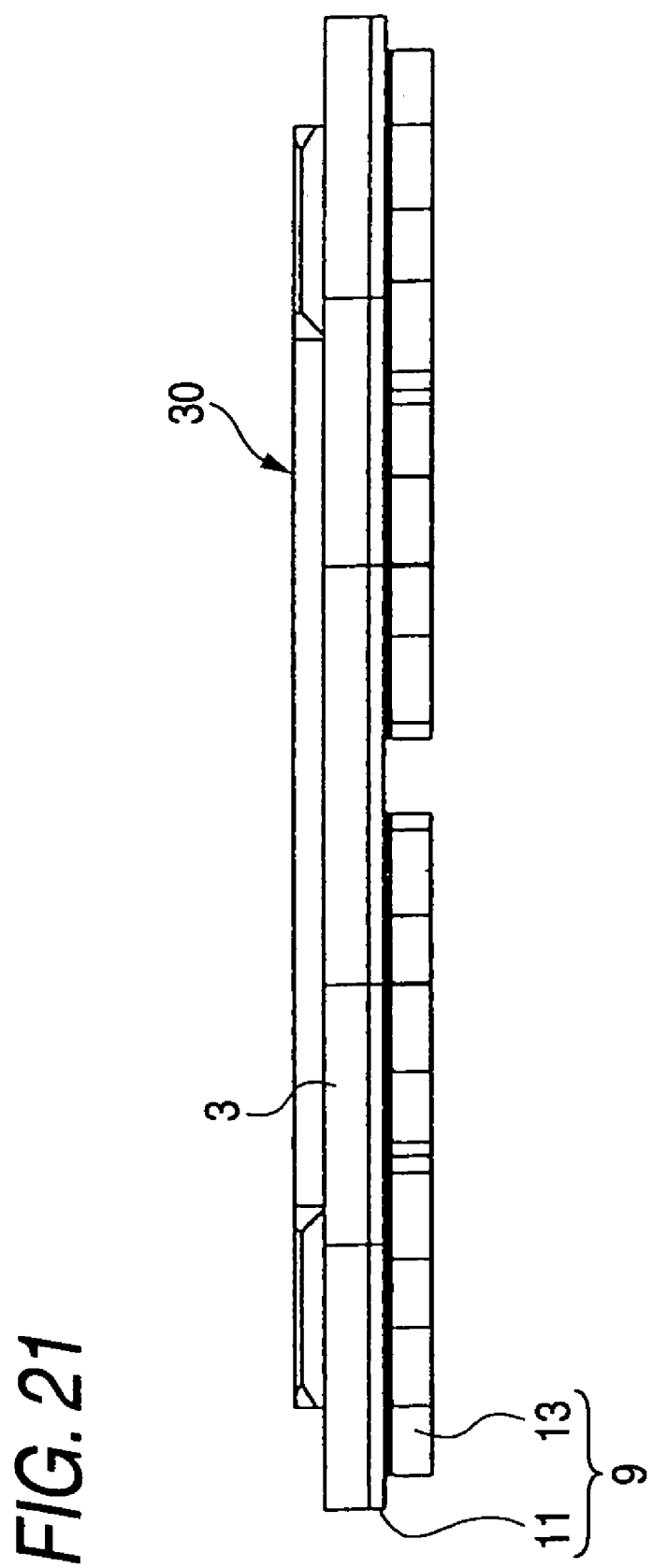
FIG. 21 is a view viewing FIG. 20 from an arrow mark G direction.
Figure 22:
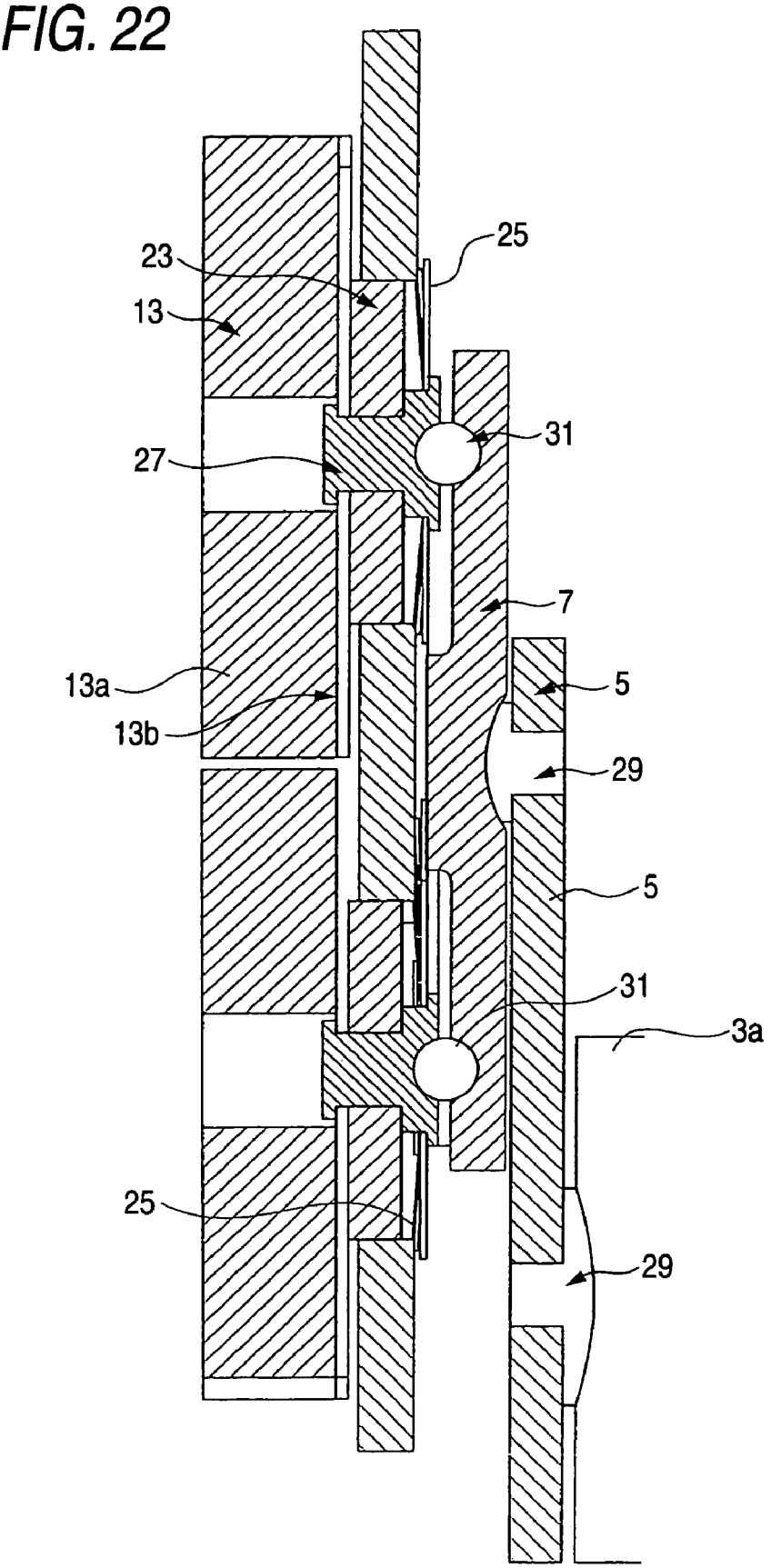
FIG. 22 is a sectional view taken along a line H-H of FIG. 19.
Figure 23:
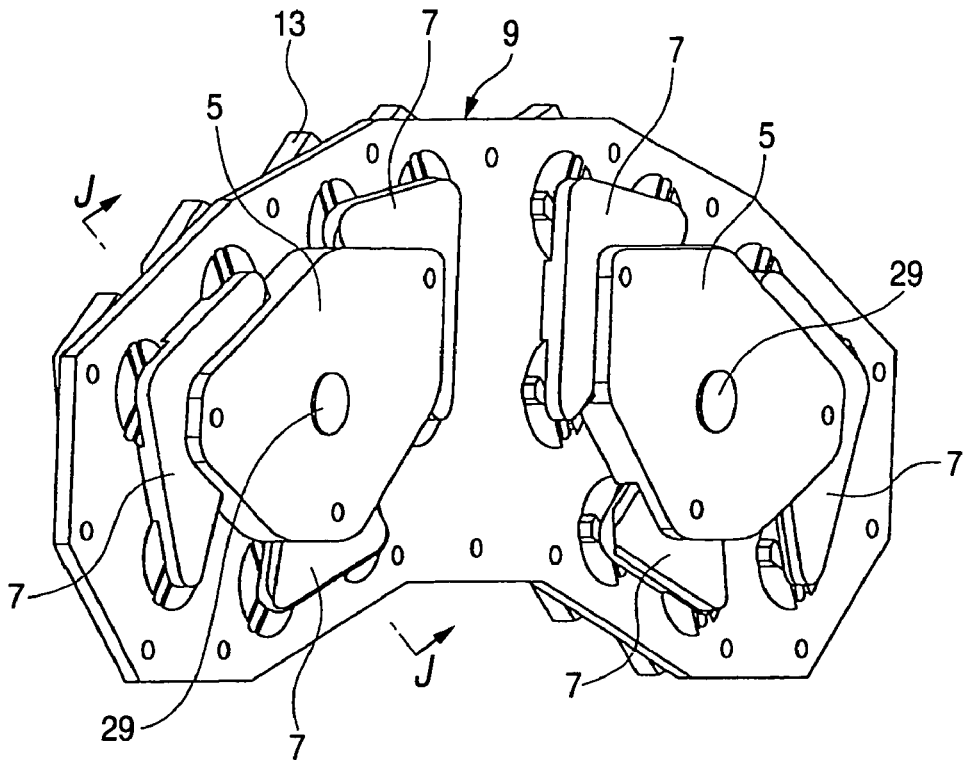
FIG. 23 is a perspective view of a state of removing a torque receive plate from the brake lining shown in FIG. 19.
Figure 24:
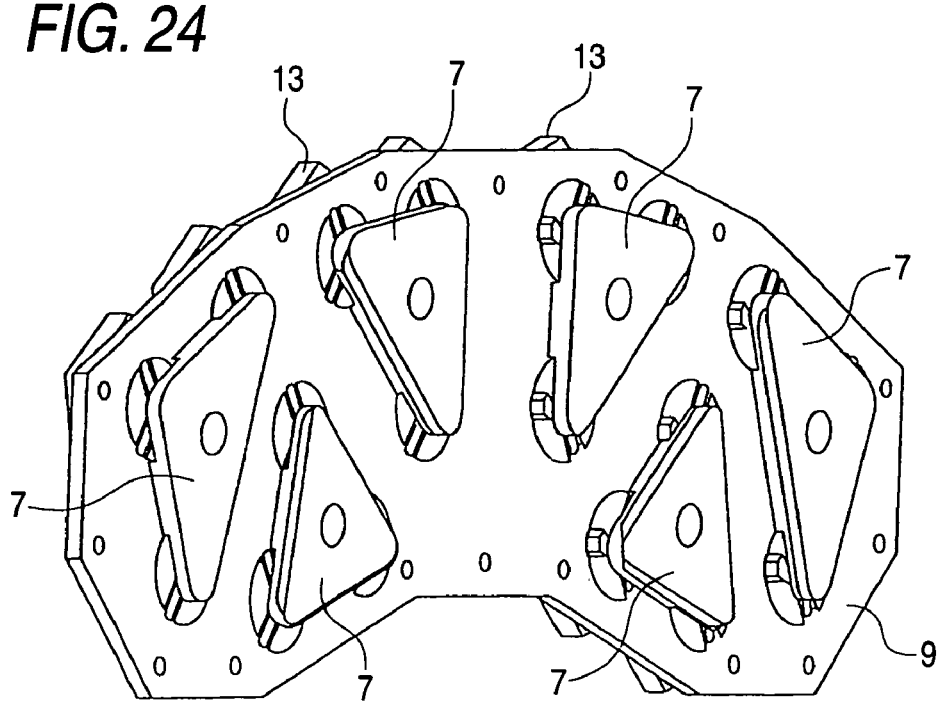
FIG. 24 is a perspective view of a state of removing a second link plate from a state shown in FIG. 23.
Figure 25:
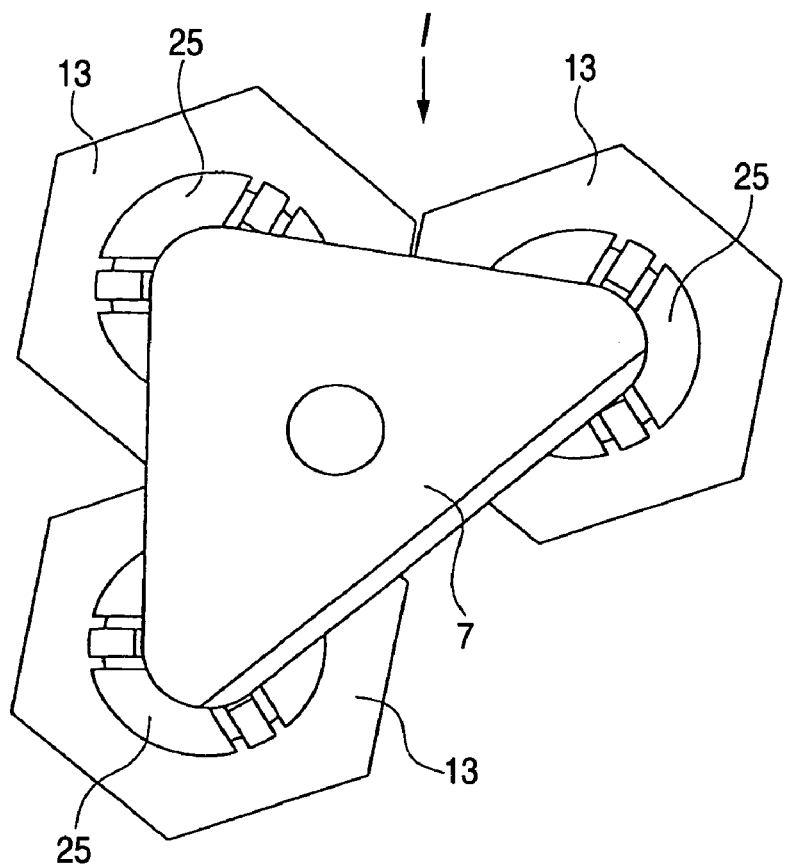
FIG. 25 is an explanatory view of a positional relationship between a first link plate shown in FIG. 24 and three lining members supported by the first link plate 7.
Figure 26:
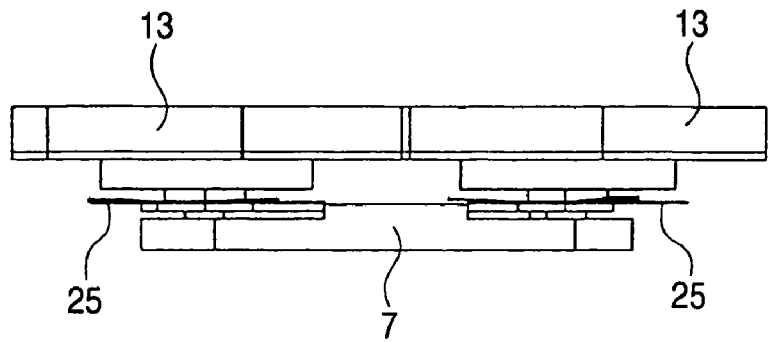
FIG. 26 is a view viewing FIG. 25 from an arrow mark I direction.
Figure 27:
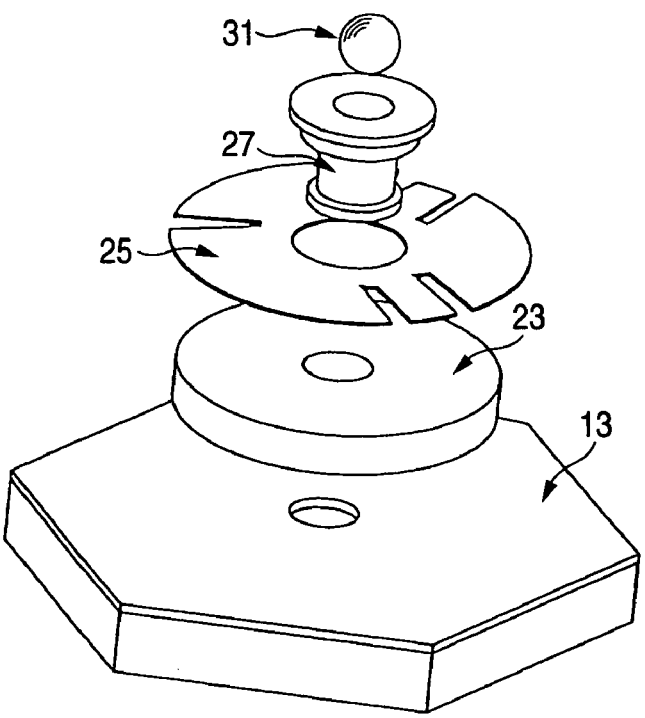
FIG. 27 is a disassembled perspective view of the lining member shown in FIG. 25 and a locking member for holding the lining member at a guide hole of a guide plate.
Figure 28:
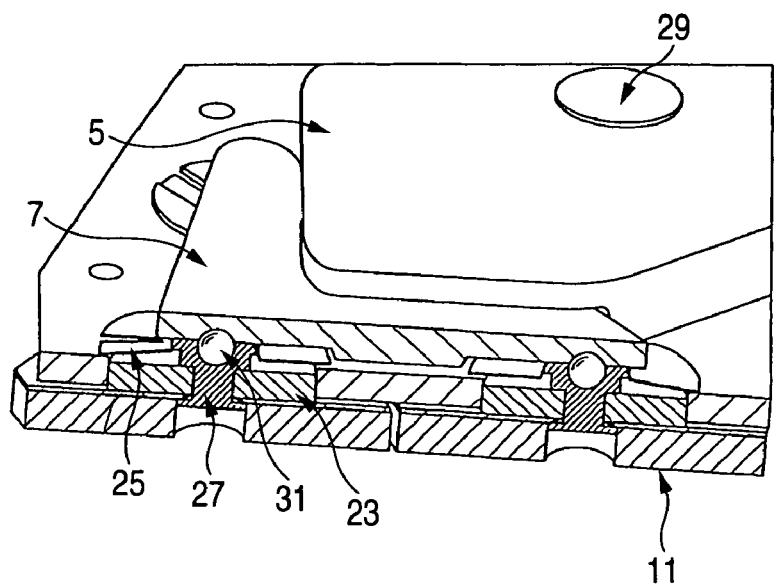
FIG. 28 is a sectional perspective view taken along a line J-J of FIG. 23.

FIG. 18 through FIG. 28 show a second exemplary embodiment of a brake lining 30 according to the invention. FIG. 18 is a perspective view of the second exemplary embodiment of the brake lining 30 according to the invention. FIG. 20 is a front view of the brake lining 30 shown in FIG. 18. FIG. 21 is a view viewing FIG. 20 from an arrow mark G direction. FIG. 22 is a sectional view taken along a line H-H of FIG. 20. FIG. 23 is a perspective view of a state of removing the torque receive plate 3 of the brake lining 30. FIG. 24 is a perspective view of a state of removing the second link plate 5 from the state shown in FIG. 23. FIG. 25 is an explanatory view of a positional relationship between the first link plate 7 shown in FIG. 24 and three of the lining members 13 brought into contact with the first link plate 7. FIG. 26 is a view viewing FIG. 25 from an arrow mark I direction. FIG. 27 is a disassembled perspective view of the lining member 13 shown in FIG. 25 and a locking member for holding the lining member 13 at the guide hole 17 of the guide plate 11. FIG. 28 is a sectional perspective view taken along a line J-J of FIG. 23.

According to the brake lining 30 of the second exemplary embodiment, a number of mounting the lining members 13 is increased. In accordance therewith, although the shape of the torque receive plate 3 is changed by positions of arranging the first link plate 7 with which the lining member 13 above the lining assembly 9 is brought into contact while maintaining the individually pivotable state and the second link plate 5 for pressing gravitational center positions of a number of the first link plates 7, the basic constitution is common to that in the case of the first exemplary embodiment. Therefore, an explanation of constitutions of respective portions will be omitted by attaching numerals common to those of the first exemplary embodiment.

Further, in the case of the present exemplary embodiment, a steel ball 31 is used in place of the joint member 29 at a portion for bringing the first link plate 7 and the lining member 13 into contact with each other. It is common to the first exemplary embodiment that the joint member 29 is used for bringing the second link plate 5 into pivotable contact with the torque receive plate 3.

According to the present exemplary embodiment, a number of mounting the lining members 13 are increased. Therefore, a performance of being brought into contact with the disc rotor can be improved by a unit of a smaller contact area. As a result, the braking characteristic can further be stabilized.

Further, in the brake lining according to the invention, a number of mounting the lining members 13 to the single guide plate 11 is not limited to that in the above-described exemplary embodiments.

Further, although in the above-described exemplary embodiments, in transmitting the press force from the torque receive plate 3 to the lining member 13, two sheets of link plates of the second link plate 5 and the first link plate 7 are interposed, also the number of the interposed link plates is not limited to that in the above-described exemplary embodiments.

For example, when the number of mounting the lining members 13 is increased more than that in the second exemplary embodiment, the number of the second link plate for pressing the first link plate may be increased and a third link plate for pressing a number of the second link plates may be added between the second link plates and the torque receive plate 3.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A friction member assembly for a disc brake comprising:
    a plurality of lining members;
    a guide plate having a number of hole portions, wherein the respective lining members are held through the hole portions;
    a plurality of torque transmitting rings with a spherical outer shape portion so that the each of the torque transmitting rings is pivotable in the each of the hole portions, wherein an outer shape portion of each of the torque transmitting rings brought into contact with a cylindrical inner peripheral surface of each of the hole portions;
    a plurality of fastening members;
    a plurality of spring members; and
    one of a plurality of link plates;
        wherein the torque transmitting rings are fitted inside the hole portions by the fastening members by interposing the torque transmitting rings between the lining members and the spring members, and
        the respective lining members are pivotable and capable of being pushed toward a face of a disc rotor by one of the link plates.

2. The friction member assembly according to claim 1, wherein the guide plate is arranged in parallel with the face of the disc rotor, and
    at least two or more of the lining members are capable of being actuated by one of the link plates, while each of the lining members is pivotable.

3. The friction member assembly according to claim 1, further comprising:
    a torque receive plate fastened to the guide plate, interposing at least one of the link plates between the guide plate and the torque receive plate.

4. The friction member assembly according to claim 1, wherein the plurality of link plates include:
    a pair of first link plates, wherein each of the first link plates individually actuates two of the lining members; and
    a second link plate that simultaneously actuates the pair of first link plates and another of the lining members.

5. The friction member assembly according to claim 1, wherein positions of actuating the respective link plates are determined such that the respective lining members are pushed to the face of the disc rotor by a pertinent load distribution.

6. The friction member assembly according to claim 1, wherein the fastening members are rivets.

7. The friction member assembly according to claim 1, wherein the fastening members are fastening rods.

8. The friction member assembly according to claim 1, wherein the hole portions penetrate the guide plate from an obverse surface to a reverse surface of the guide plate and have substantially constant inner diameter throughout the obverse surface to the reverse surface, and
the torque transmitting rings have a circular shape and an outer diameter corresponding to the inner diameter of the hole portions.

9. A friction member assembly for a disc brake comprising:
a plurality of lining members;
a guide plate having a number of hole portions;
a plurality of torque transmitting rings having a circular plate shape and fitted to the hole portions;
a plurality of fastening members;
a plurality of spring members; and
a plurality of link plates;
wherein an outer shape of the torque transmitting rings in contact with a cylindrical inner surface of the hole portions is constituted by a spherical shape, and the torque transmitting rings are pivotable in the hole portions and transmit a braking torque applied to the lining members through the guide plate,
the torque transmitting rings are fitted inside the hole portions by the fastening members by interposing the torque transmitting rings between the lining members and the spring members and integrated to the guide plate, and
the respective lining members are pivotable and capable of being pushed toward a face of the disc rotor by the link plates.

10. A friction member assembly for a disc brake comprising:
a lining member;
a guide plate having a hole portion;
a torque transmitting ring fitted inside the hole portion and fixed with the lining member; and
a link plate;
wherein the hole portion penetrates the guide plates from an obverse surface to a reverse surface of the guide plate and has substantially constant inner diameter throughout the hole portion,
the torque transmitting ring has an outer diameter corresponding to the inner diameter of the hole portion, and the torque transmitting ring is slidable in the hole portion in a direction of the hole portion,
the torque transmitting ring has a spherical outer shape, and the torque transmitting ring and the lining member are pivotable,
the lining member is capable of being pushed toward a face of a disc rotor by the link plate,
a braking torque applied to the lining member is transmitted to the guide plate through the torque transmitting ring.

11. The friction member assembly according to claim 1, wherein the torque transmitting rings are slidable with respect to the hole portions in an axial direction of the disc rotor.

12. The friction member assembly according to claim 9, wherein the torque transmitting rings are slidable with respect to the hole portions in an axial direction of the disc rotor.

13. The friction member assembly according to claim 10, wherein the torque transmitting ring is slidable with respect to the hole portion in an axial direction of a disc rotor.

14. The friction member assembly according to claim 1, wherein maximum outer diameters of the torque transmitting rings are smaller than inner diameters of the respective hole portions which are constant throughout the hole portions.

15. The friction member assembly according to claim 9, wherein maximum outer diameters of the torque transmitting rings are smaller than inner diameters of the respective hole portions which are constant throughout the hole portions.

16. The friction member assembly according to claim 10, wherein a maximum outer diameter of the torque transmitting ring is smaller than the constant inner diameter of the hole portion.

* * * * *